US012456570B2

(12) United States Patent
Joseph et al.

(10) Patent No.: US 12,456,570 B2
(45) Date of Patent: Oct. 28, 2025

(54) PLANAR MAGNETIC DEVICES EXHIBITING ENHANCED THERMAL PERFORMANCE

(71) Applicant: Kostal of America, Inc., Troy, MI (US)

(72) Inventors: Alan Joseph, Shelby Township, MI (US); Joel Anderson, Ferndale, MI (US)

(73) Assignee: Kostal of America, Inc., Troy, MI (US)

( * ) Notice: Subject to any disclaimer, the term of this patent is extended or adjusted under 35 U.S.C. 154(b) by 1311 days.

(21) Appl. No.: 16/517,612

(22) Filed: Jul. 21, 2019

(65) Prior Publication Data

US 2021/0020353 A1 Jan. 21, 2021

(51) Int. Cl.
*H01F 27/28* (2006.01)
*H01F 41/04* (2006.01)

(52) U.S. Cl.
CPC ....... *H01F 27/2804* (2013.01); *H01F 41/041* (2013.01)

(58) Field of Classification Search
CPC ......... H01F 27/2804; H01F 2027/2809; H01F 17/0013; H01F 17/0006; H01F 5/003
USPC .................................................. 336/200, 232
See application file for complete search history.

(56) References Cited

U.S. PATENT DOCUMENTS 4,873,757 A 10/1989 Williams
5,548,265 A 8/1996 Saito
6,211,767 B1 4/2001 Jitaru
6,831,544 B2 12/2004 Patel et al.
2003/0179067 A1* 9/2003 Gamou ............... H01F 27/2804 336/223
2007/0139151 A1* 6/2007 Nussbaum .............. H03F 1/565 336/200
2011/0248809 A1* 10/2011 Gertenbach ........... H01F 27/346 336/173
2016/0217913 A1* 7/2016 Cheng ..................... H01F 27/42
2018/0317313 A1 11/2018 Kegeler

FOREIGN PATENT DOCUMENTS

JP 61042109 A * 2/1986 ......... H01F 17/0006
JP 06140250 A * 5/1994
JP 2009117546 A * 5/2009
WO WO-2017080554 A1 * 5/2017 ......... H01F 27/2804

OTHER PUBLICATIONS

Chinese Office Action (including partial English translation) issued in App. No. CN2020106993136, dated Mar. 10, 2025, 9 pages.

* cited by examiner

*Primary Examiner* — Tszfung J Chan
(74) *Attorney, Agent, or Firm* — Gunther J. Evanina; Butzel Long

(57) ABSTRACT

A magnetic device, such as an inductor or transformer, having enhanced thermal performance characteristics includes first and second parallel adjacent conductive layers patterned to define conductive spiral traces, wherein the traces are geometrically patterned to avoid overlapping of gap areas defined between the adjacent spiral traces, and thereby provide for improved heat transfer between adjacent conductive layers in the device.

3 Claims, 2 Drawing Sheets

PLANAR MAGNETIC DEVICES EXHIBITING ENHANCED THERMAL PERFORMANCE

FIELD OF THE DISCLOSURE

This disclosure relates to planar magnetic components using printed circuit boards (PCB) as the winding carrier, and more particularly to planar magnetic components in which the electrically conductive windings in adjacent layers are configured to enhance thermal performance.

BACKGROUND OF THE DISCLOSURE

In order to achieve better reproducibility, more compact designs, and greater economy, as compared with wire windings, planar magnetic components on PCB are being increasingly and advantageously employed in a variety of applications, especially in transportation (e.g., automotive) and portable electronics (e.g., mobile telephones) applications. These devices comprise spiral conductive traces defined in or on planar layers of a PCB having multiple conductive layers in a stacked arrangement with different conductive layers in the stack appropriately electrically connected with vias to produce a magnetic component, such as a transformer or an inductor. The conductor layers are physically separated by an electrical insulator or dielectric material, typically a glass fiber reinforced epoxy resin, which is typically a very poor thermal conductor. As a consequence, higher power magnetic components can develop hot spots that overheat, and over time can cause premature deterioration and failure of the component.

The conventional solution was to increase the thickness or width of the conductive winding so that high thermal gradients are dissipated by thermal conduction through the electrical conductors. This is a viable and often acceptable solution. However, this solution increases the size and mass of the component, reducing or eliminating some of the benefits of employing planar magnetic components on PCB. Such increase in size and mass is particularly undesirable in portable electronic devices.

Accordingly, there is a need for planar magnetic components on PCB that provide better thermal performance while also minimizing the amount of conductive material needed.

SUMMARY OF THE DISCLOSURE

Disclosed is a planar magnetic device, such as an inductor or transformer having first and second parallel adjacent conductive layers separated by a layer of dielectric material, in which each of the conductive layers is patterned to define a spiral conductive trace having more than a single turn or winding to define a gap between windings, wherein the geometric pattern of the traces is selected so that at least a portion of the gap area between turns of the conductive trace in one layer is not aligned with the gap area between turns of the adjacent spiral trace.

DETAILED DESCRIPTION

Figure 1:
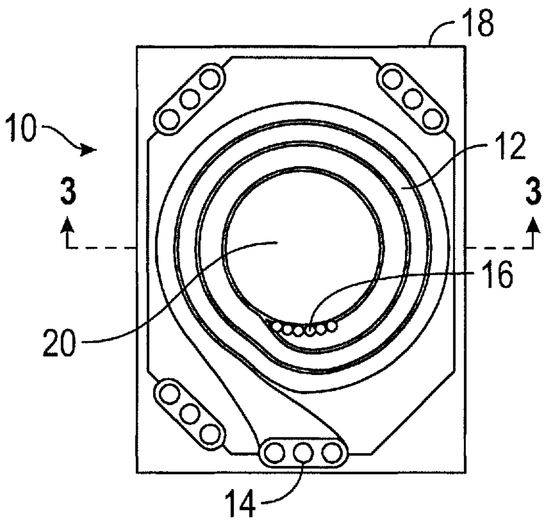
FIG. 1 (Prior Art)
FIG. 1 is a top view of a conductive layer of a magnetic device in accordance with known (prior art) technology.
Figure 2:
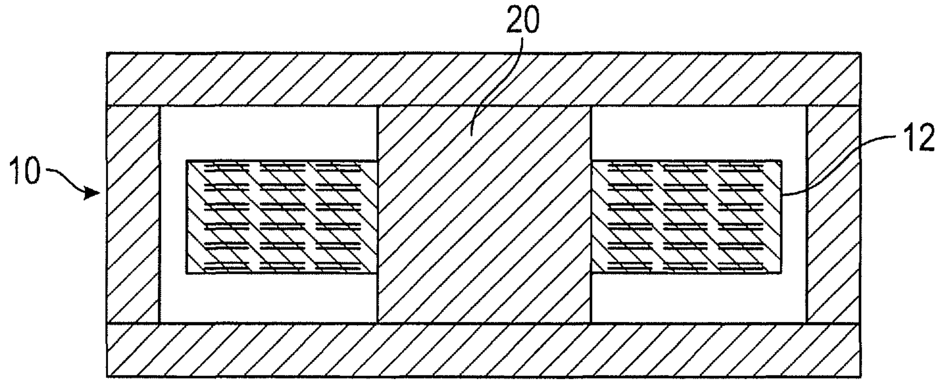
FIG. 2 (Prior Art)
FIG. 2 is a cross-sectional elevation view of the magnetic device in accordance with known (prior art) technology.
Figure 3:
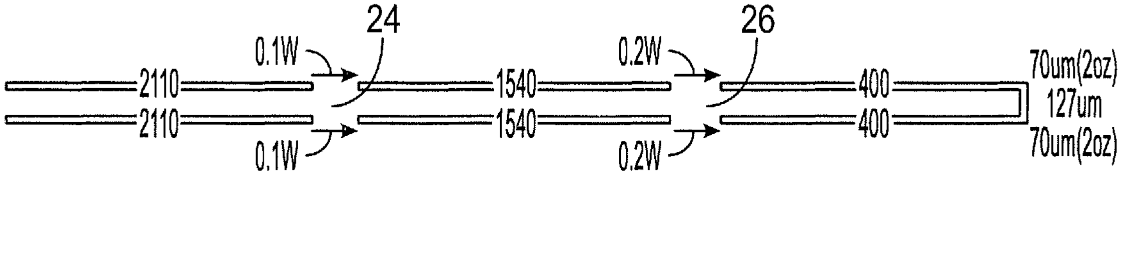
FIG. 3 (Prior Art)
FIG. 3 is an enlarged cross-sectional elevation view of a section of the magnetic device of FIG. 2 showing adjacent spiral conductive traces and illustrating thermal performance characteristics.

A conventional magnetic device 10 is illustrated in FIGS. 1-3. The device can be, for example, an inductor or a transformer depending on how the electrically conductive layers 12 (shown in FIG. 2) are configured and electrically connected. For example, in the illustrated device 10, the first (top) electrically conductive layer (typically copper layer) can be electrically connected with the third, fifth, seventh, ninth and eleventh layers from the top, either serially or in parallel, and the remaining second, fourth, sixth, eighth, tenth and twelfth electrically conductive layers from the top can be electrically connected, either serially or in parallel, to produce a transformer. As another example, all of the electrically conductive layers can be electrically connected, either serially or in parallel, to produce an inductor.

A single electrically conductive layer defining a spiral conductive trace 12 having three turns or windings is shown in FIG. 1. A conductive trace in any layer can be electrically connected to a conductive trace in another layer through a vias 14, 16. Unused vias 18 are also shown in FIG. 1. A central magnetic core 20 (e.g., ferrite) extends through the center of the printed circuit board (PCB) 12 such that each of the conductive spiral traces is wound around the magnetic core. The magnetic core serves to increase the strength of the magnetic field generated by passing electrical current through the windings and thus increase the inductance.

For the conventional magnetic device 10 shown in FIGS. 1-3, adjacent conductive layers defining spiral traces are identical and are generally designed to overlap perfectly, such that the gaps 24, 26 between adjacent traces overlap. As a consequence, heat flows along the spiral trace from the inner turn closest to the core 20 toward the outer turn furthest from the core, and also between the gap. This results in relatively inefficient heat transfer, with the inner turn(s) being much hotter than the outer turn(s). In the illustrated embodiment, the conventional device 10, when operated at steady state after warm-up, has an unacceptably high temperature of 211° C., at the inner turn, a still very high temperature of 154° C. at the middle turn, and an acceptable temperature of 40° C. at the outer turn.

In addition to having identical overlapping traces, the conventional device 10 has traces that have a uniform width along the length of the spiral trace. It is believed that designers thought that a uniform width along the length of the spiral trace would provide the lowest electrical resistance.

Figure 4A:
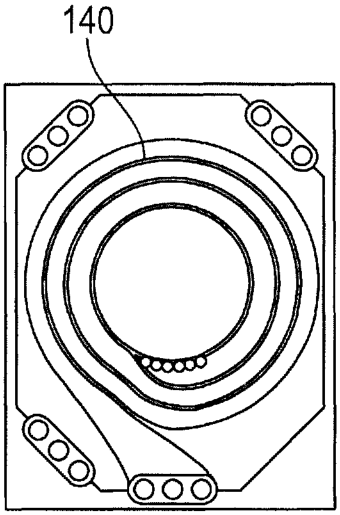
FIG. 4A is a top view of a conductive layer of a magnetic device in accordance with this disclosure.
Figure 4B:
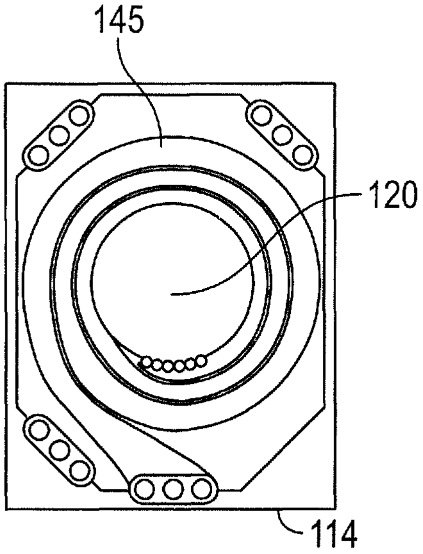
FIG. 4B is a top view of a second conductive layer which is adjacent the conductive layer of FIG. 4A.
Figure 5:
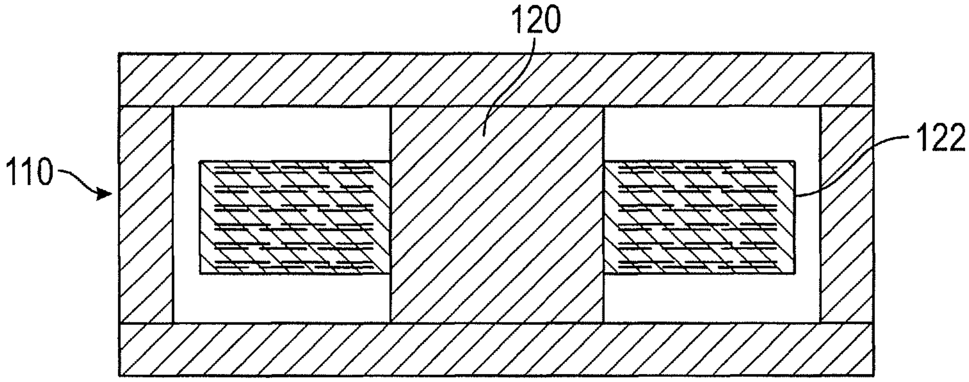
FIG. 5 is a cross-sectional elevation view of the magnetic device of FIGS. 4A and 4B.
Figure 6:
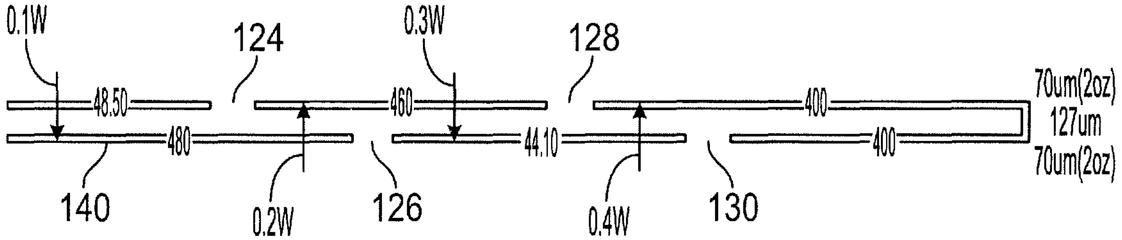
FIG. 6 is an enlarged cross-sectional elevation view of a section of the magnetic device of FIG. 5 showing adjacent spiral conductive traces and illustrating thermal performance characteristics.

It has been determined that very substantially improved thermal performance can be achieved by varying the width of the trace along the length of the trace for at least one of two adjacent conductive layers. The improved design is illustrated in FIGS. 4-6, which show a device 110 having 12 layers of electrically conductive material (copper). Device 110 is generally similar to device 10 in terms of both the size, materials and structure or configuration, except that at least one of two adjacent conductive layers separated by a single layer of dielectric material has a spiral trace that has a width that varies along the length of the trace so that all gaps 124, 126, 128 and 130 are overlapped or underlied by the spiral trace in the adjacent conductive layer. In the illustrated embodiment of FIGS. 4-6, a lower trace 140 has a uniform width along its spiraling length whereas an adjacent upper trace 145 has a width that varies (e.g., increases continuously) along its spiral length from the inner turn adjacent core 120 to the outer turn terminating at vias 114. With this arrangement, a smaller temperature gradient is developed between adjacent turns in the two conductive traces causing heat to flow through the dielectric layer (comprising PCB 122) between traces 140 and 145 and effectively transfer heat between the traces 140 and 145, reducing or eliminating significant heat transfer through gaps 124, 126, 128 and 130. The devices 10 and 110 employ the same amount of conductive material (copper) but achieve profoundly different thermal characteristics, with device 110 having a maximum temperature of about 48.5° C. at the inner turn of trace 145.

In certain preferred embodiments, first and second parallel adjacent conductive layers separated by a single layer of dielectric material, each define spiral conductive traces having more than a single turn or winding, wherein the geometry of the traces is selected so that any straight line perpendicular to the parallel adjacent conductive layer intersects at least one of the conductive spiral traces (i.e., all gaps in the adjacent traces are not aligned). The number of turns is typically, but need not be, an integer. For example, the number of turns could be 1.5, 2.25, 2.5, or any other value greater than 1. The arrangement in which no gaps are aligned provides excellent thermal characteristics, with the outer most turn in the conductive spiral traces being only a few degrees (e.g., 5° C., 10° C. or 20° C.) higher than the inner most turn. However, improvements in accordance with the principles disclosed herein can be achieved even when less than all gaps in the adjacent traces are not aligned. In this regard, the disclosed magnetic devices encompass those having two adjacent spiral traces with more than a single winding in which at least 5%, 10%, 20%, 30%, 40%, 50%, 60%, 70%, 80% or 90% of the gap area (total area between turns of the conductive trace) is not aligned with the gap area of the adjacent spiral trace.

The illustrated embodiments are exemplary only, it being understood that any number of conductive layer pairs can be used and that the width of at least one layer of each conductive layer pair has a width that varies along its length.

The above description is intended to be illustrative, not restrictive. The scope of the invention should be determined with reference to the appended claims along with the full scope of equivalents. It is anticipated and intended that future developments will occur in the art, and that the disclosed devices, kits and methods will be incorporated into such future embodiments. Thus, the invention is capable of modification and variation and is limited only by the following claims.

What is claimed is:

1. A planar magnetic device, comprising:

a first conductive layer, and a second conductive layer parallel with and separated from the first conductive layer by a layer of dielectric material, the first conductive layer patterned to define a first spiral conductive trace having more than a single turn or winding and to define a first spiral gap area between turns, the second conductive layer patterned to define a second spiral conductive trace having more than a single turn or winding and to define a second spiral gap area between turns, the geometric patterns of the first spiral conductive trace and the second spiral trace each having continuous curvature wherein one of the first spiral conductive trace and the second spiral conductive trace has a width that varies continuously along its length, and the other of the first spiral conductive trace and the second spiral conductive trace has a uniform width along its length, and wherein the first spiral conductive trace overlaps the entire second spiral gap area and the second spiral trace underlies the entire first spiral gap area.

2. The planar magnetic device of claim 1, wherein the first spiral conductive trace and the second spiral conductive trace are wound around a magnetic core.

3. The planar magnetic device of claim 1, wherein the first spiral conductive trace and the second spiral conductive trace are electrically connected in parallel or series.

* * * * *